Figure 1:
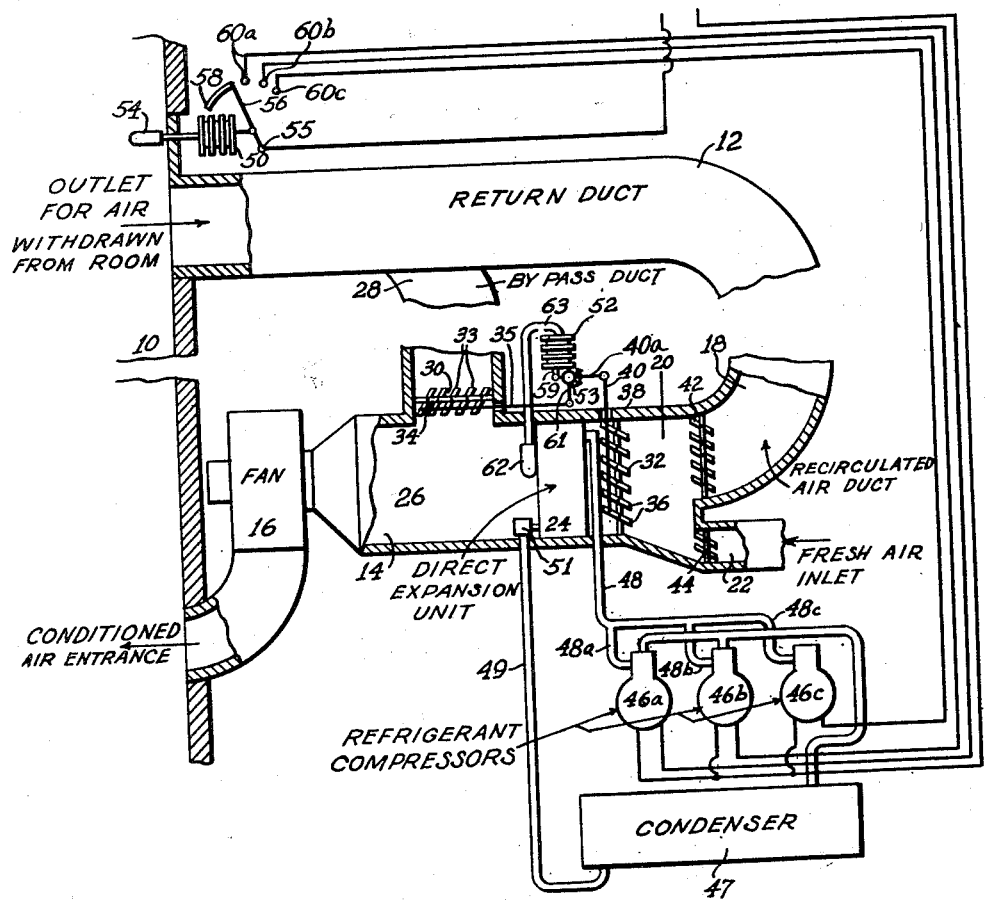

Dec. 16, 1947.    M. A. RAMSEY    2,432,587
AIR CONDITIONING
Filed May 10, 1943    2 Sheets-Sheet 1

Inventor
MELVIN ATKINSON RAMSEY

By Richard J. Geier
Attorneys

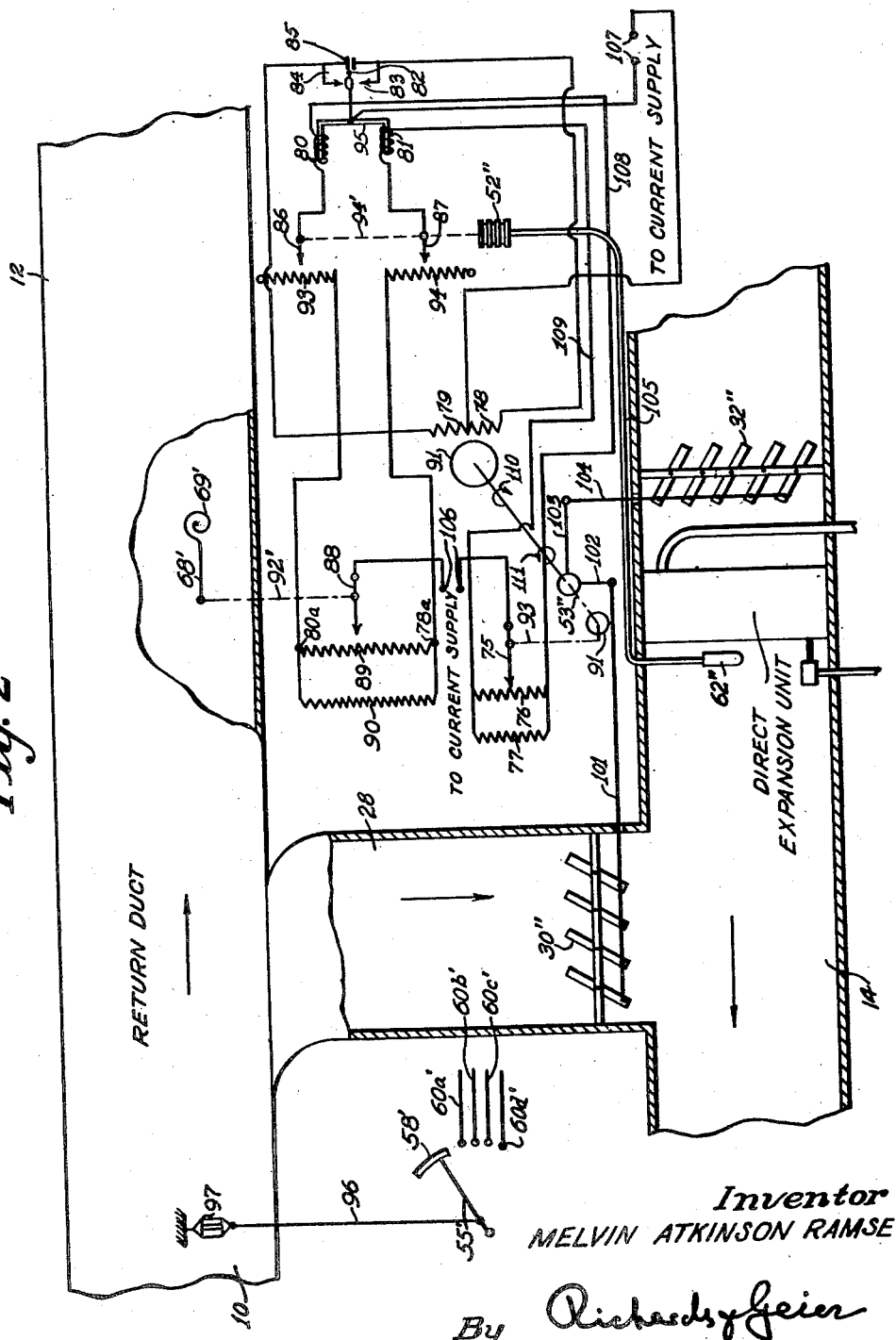

Patented Dec. 16, 1947

2,432,587

UNITED STATES PATENT OFFICE 2,432,587

AIR CONDITIONING

Melvin Atkinson Ramsey, Buenos Aires, Argentina

Application May 10, 1943, Serial No. 486,385

6 Claims. (Cl. 62—6)

This invention relates to air conditioning and refers more particularly to air conditioning methods wherein portions of the recirculated air are by-passed with respect to air-conditioning devices, and to apparatus for carrying out these methods.

This application is a continuation-in-part of my copending United States patent application, Ser. No. 304,317, filed November 14, 1939, for Method and apparatus for conditioning air, now Patent No. 2,321,242.

The by-passing of a portion of the main stream of recirculated air in such manner that the by-passed portion is not subjected to the action of cooling and dehumidifying devices, is carried out mainly for the purpose of diluting freshly conditioned air with air withdrawn from the conditioned space, for the purpose of maintaining constant temperature and humidity factors in the conditioned space. Installations of this type must provide means for varying the proportion of by-passed air, as well as means for controlling the cooling medium producing the freshly conditioned air. Heretofore in the installations with which applicant is familiar, the proportion of by-passed air to freshly conditioned air has been controlled in dependence upon the temperature in the conditioned space, and the capacity of the cooling medium was adjusted depending upon temperature variations in that space. It was found that such installations are fairly satisfactory if the response of the cooling medium to changes in capacity of the installations is relatively slow, as is the case with water cooling, but are unsuitable in practice when it is desired to use direct expansion coils as the cooling medium, for the reason that the capacity of the cooling devices will vary with considerable frequency and the compressor motor will be cut in and out repeatedly, which is highly undesirable.

An object of the present invention is the provision of air conditioning wherein expansion coils are utilized as the cooling medium and wherein the objectionable frequent cutting in and out of the compressor motors is avoided.

The above and other objects of the present invention may be realized by controlling the capacity of the refrigerator in accordance with variations in the temperature of the conditioned space or room temperature and by operating dampers which determine the proportion of by-passed air by a device responsive to a function of the surface temperature of the direct expansion coils.

Preferably, this device includes setting adjustment means operatively associated with means responsive to room conditions, whereby the setting of the device may be altered automatically to meet abnormal conditions.

Room temperature or temperature of the conditioned space will generally fluctuate at a very slow rate so that demands for extra capacity will not be frequent on this score. On the other hand, a device responsive to a function of the surface temperature of the evaporator and arranged to control the dampers, can adjust the relative proportions of recirculated and conditioned air so as to maintain constant conditions in the room, without calling for changes in capacity, at least until such a degree of disparity between the conditions in the room and the setting of the capacity controlling device has arisen as to cause the latter to respond.

The invention will appear more clearly from the following detailed description when taken in connection with the accompanying drawings showing, by way of example, preferred embodiments of the inventive idea.

In the drawings:

Figure 1 is a diagram illustrating one embodiment of the present invention, and Figure 2 is a diagram illustrating a modification.

Figure 1 shows a room 10 which is to be conditioned and which is connected with a return air duct 12. A fan 16 is situated in a suction passage 14 which is connected with the return duct 12 through a by-pass duct 28 and also through a duct 18 communicating with a chamber 20. The suction passage 14 is also in communication with the chamber 10. The space 20 constitutes a refrigerating and dehumidifying zone which also receives fresh air from a fresh air duct 22. A direct expansion unit 24 is situated in the passage 14 close to a mixing zone 26.

A damper 30 is provided in the by-pass duct 28 for controlling the proportion of by-passed air, while a second damper 32 is located on the side of the direct expansion unit 24 nearest to the spent air discharge 18. The dampers may be of any suitable known type; for the sake of convenience, the dampers 30 and 32 have been shown as of the louvre type comprising a plurality of vanes 33 and 36 adapted to be moved by actuating bars 35 and 40 respectively and pivoted by the frame members 38. Links 61 and 40a connect respectively bars 35 and 40 to a pivot member 53.

If desired, dampers 42 and 44 may be installed in the spent air discharge opening 18 and in the mouth of the fresh air inlet 22. These dampers 42 and 44 may be manually adjustable.

A direct expansion unit 24 is connected by a suction line 48 and branch suction lines, 48a, 48b and 48c to motor operated compressors 46a, 46b and 46c, respectively, and to a condenser 47 by a liquid-transmitting line 49 through a valve 51. Instead of using more than one compressor for variable refrigerating capacity, a single compressor of variable capacity may be used.

The valve 51 may be a thermostatically controlled expansion valve, a refrigerant float valve or any other known means of controlling the flow of refrigerant between the condenser 47 and the evaporator or direct expansion unit 24. It is immaterial whether each compressor has its separate condenser or all compressors discharge into one condenser, so long as the liquid-transmitting lines of all the condensers enter a common liquid-transmitting line before supplying the direct expansion unit. There may be one or more direct expansion units so long as they are all fed with refrigerant from a single liquid-transmitting line through one or more refrigerant control valves and the evaporated refrigerant from all enters a common suction line.

According to the present invention, the compressors are controlled by a device responsive to room conditions and comprising a gas filled bulb 54 and a bellows 50 so connected that rise in temperature will expand the bellows and move an arm 56 connected therewith and a contact 58 carried by the arm 56. The contact 58 may swing clockwise around pivot 55, successively contacting points 60a, 60b and 60c which are located in circuits comprising the motors of the compressors 46a, 46b and 46c. These compressors, therefore, will be successively started.

The described device for controlling the compressors is one form of temperature control or thermostat, but the device may be any known form of temperature control, such as a thermostat, humidity control, humidistat or combination of these, as required or desired to maintain the particular conditions required of the installation.

The bulb 54 may be positioned in room 10 in the neighborhood of the air outlet as shown or in the return duct 12, since the air therein is in substantially the same condition as the air in the room in the neighborhood of the outlet of the air withdrawn from the room.

The device for controlling the dampers 30 and 32, so as to govern the proportion of by-passed recirculated air and conditioned air, includes a bulb 62 which is located close to the surface of the direct expansion unit 24 and which is connected to a bellows 52. The bulb 62 contains a fluid which expands with a rise in temperature thus distending the bellows 52 and causing arms to rotate, with the result that the bar 40 moves upward, thereby moving the damper 32 further toward its closed position; the bar 35 moves at the same time to the right, shifting the damper 30 further toward the open position.

This device may, of course, be replaced by any known device for moving dampers in response to a sensitive element, such as the bulb 62, either directly or indirectly, for instance, pneumatically, electrically or in any other form. The sensitive element or bulb may be located in any position where it will be responsive to a function of the temperature of the expansion unit surface.

As already stated, the damper-controlling device is responsive to a function of the surface temperature of the refrigerator coils, the word "function" is to be understood in the sense usually given it in mathematics. For example, the temperature inside the coils, a short distance away from the coils, or the evaporation pressure in the suction pipes may all be considered as functions of the surface temperature. The conditions at a point a short distance away from the coils on the side thereof nearest to the fan 16 are substantially equal to those in close proximity to the coils, and these latter obviously depend upon the surface temperature. The expression "a short distance away from the coils" is used to indicate a distance far enough to constitute actual separation but not far enough to bring the sensitive member 62 within the influence of the stream of by-passed air, namely, within the mixing zone 26.

Thus the sensitive member 62 may be located in close contact with the surface of the coils of a direct expansion unit, between the coils themselves, within the suction pipes or at a point between the direct expansion units and the mixing zone.

The operation of the system is apparent from the above. Air from the room 10 is drawn through a return duct 12 by the fan 16. A part of the spent air reaches the suction space 14 through the by-pass duct 28, while another part of the spent air is discharged through the duct 18 into the space 20 where fresh air entering through the duct 22 is added to the spent air. The mixture passes over the direct expansion unit 24 into the mixing zone 26 in front of the suction zone 14. The system is designed to operate on the principle of maintaining substantially constant the coil surface temperature of the direct expansion unit by adjusting the relative proportions of by-passed to intensively conditioned air in accordance with the varying values of a function of the surface temperature, while the capacity of the refrigerator plant is altered in accordance with variations in room conditions.

If the adjusting devices are set for certain conditions designated as normal in the room 10, the dampers 30 and 32 are so adjusted that the mixture discharged by the fan 16 will preserve these conditions. If the room 10 is untenanted, so that conditions prevailing there are not disturbed, the damper 30 will be substantially fully open and the damper 32 will be practically completely closed; the compressor motors will not operate, the direct expansion unit will not be refrigerating and substantially all of the recirculated air will be by-passed.

If conditions in the room are changed through occupancy, heat or moisture until a point within the setting range is reached, the first compressor motor is started by the element 54 and the members connected therewith, whereupon the surface temperature of the corresponding coils will be very rapidly lowered to within the range for which the damper control device 52 is set. The device 52 will adjust the dampers so as to decrease the proportion of by passed air and to increase the amount of conditioned air, in order to counteract the chilling of the coils. The factor tending to restore conditions in room 10 to normal is the proportion of conditioned air, and this depends on the extent to which a given volume of recirculated air can maintain the coil surface temperature within the predetermined limits of constancy.

The capacity controlling device will tend to keep the first compressor motor running until normal conditions are restored in the room 10, but the longer the compressor motor runs the more pronounced will be the refrigeration effect in the coils, so that in order to maintain the coil surface temperature constant, a greater volume of conditioned air will be required. Hence the damper-control device 52 will continue to close the damper 30 and to open the damper 32 until the volume of conditioned air is such that equilibrium is established. Owing to the relation between the volume of the return duct and that of the room space, a certain time will elapse before normal conditions are fully restored or until a point is reached at which the capacity controlling device operates to cut out the compressor motor.

Thus by causing the proportion of conditioned air to be governed not by room conditions but by the coil surface temperature, the compressor motor will be allowed to run for a reasonable time before being stopped and will not be restarted until a time period representing the lag of the room space to respond to conditioning has passed.

If the effects of the disturbing factor in the room 10 continually increase, then the capacity controlling device will operate eventually to start the second compressor motor, in the same manner in which the first one was started.

The compressor motors will be running and resting for reasonable periods which do not give rise to objectionable results so far as the motors are concerned. At the same time, the damper controlling device 52 by actuating the dampers in the described manner will insure that the motors are running for only the minimum time consistent with economy and satisfactory air conditioning.

The damper controlling device ensures that the controlled capacity of refrigeration is efficiently utilized to secure the desired correct proportion of latent to sensible heat.

Obviously, the described system will not operate as desired if it contains a substance which will freeze or otherwise change its state under any conditions prevailing at the bellows 52 or the bulb 62. However, if the substance will remain liquid throughout all occurring temperatures and pressures, or if it is a gas which remains a gas under any conditions likely to exist, the system will operate in the indicated manner.

Figure 2 illustrates another manner of operating the device, wherein the control range of the sensitive element 62" is modified in accordance with changes in the condition of the room 10 or the return duct.

Dampers 30" and 32" are operated by a shaft 53" through the medium of levers 101, 102 and 103, 104, respectively. The shaft 53" is driven by the small motor 91 which has two windings; winding 78 which will cause the motor to rotate counterclockwise and a winding 79 which will cause the motor to rotate the contact 75 clockwise over a potentiometer 76. Apparatus 85 is a condenser to reduce sparking at contacts 82, 83 and 84. The motor 91 is also connected by an arm 93 with a contact 75. The windings 78 and 79 are the motor windings which when energized cause the rotation of the motor 91 in the direction of arrows 111 and 110, respectively.

A temperature-sensitive element 69' is situated in the return duct and is connected by an arm 68' with a link 92' connected to a contact 88 which engages and slides over a potentiometer 89.

A temperature sensitive bulb 62" is situated close to the direct expansion unit. A conduit 105 connects the bulb 62" with bellows 52". The bellows 52" is connected by an arm 94' with two contacts 86 and 87. The contact 86 slides over a resistance 93, while the contact 87 slides over a resistance 94. Resistances 90 and 77 are so proportioned that a small movement of contacts 86 and 87 has the same effect as a much greater movement of the contact 88. In other words, the same difference in potential may be created by a small movement of contacts 86 and 87 or by much greater movement of the contact 88.

A source of current supply, usually about twenty volts, is connected to the terminals 106 and 107.

A humidity-sensitive element 97 of the usual type is situated in the return duct or the room and is connected to an arm 96 which swings an arm 55' carrying a contact 58'. The consecutive engagement of the contact 58' with the contacts 60a', 60b', 60c' and 60d', which are connected to the refrigerator motor is used to control refrigeration capacity. The device is so set that the capacity will rise as the humidity rises.

A relay 95 includes induction coils 80 and 81 which are connected to contacts 86 and 87, respectively. A resistance 77 is connected in parallel with the resistance 76 and is also connected by wires 108 and 109 to the coils 80 and 81. The relay 95 includes a switch element 82 which may engage a contact 83 or a contact 84. The contacts 83 and 84 are connected in parallel with a condenser 85 and are also connected with coils 78 and 79 which constitute a part of the motor 91.

The circuits of the coils 80 and 81 are so selected that in the illustrated normal position each of these circuits carries the same current and the relay 95 is balanced. Then the element 82 is not in contact with either the contact 78 or the contact 79, and the motor 91 is stationary.

The system operates as follows:

As an example, let it be assumed that it is desired to maintain a predetermined temperature in the room and to keep the humidity constant at the same time. Let it be further assumed that an increase in the heat load in the room causes a rise in the temperature in the return duct. This will expand the sensitive element 69' which actuates the contact 88 through the arms 68' and 92' and will move the contact 88 toward the end 80a of the potentiometer 89. This movement will reduce the total resistance of the circuit which includes the coil 89, while the resistance of the circuit containing the coil 81 will be increased. Consequently, more current will flow through the coil 80 and less current will flow through the coil 81. Then the relay 95 will be actuated and its switching element 82 will engage the contact 84, thereby energizing the winding 79 and causing the motor 91 to rotate in the direction of the arrow 110. The motor 91 will move the rod 104 by means of the link 103 and the shaft 53", thereby opening wider the damper 32". At the same time the motor 91 actuates the damper 30" through the arms 101 and 102, closing the damper 30" more and more, until the contact 75 which is actuated by the motor 91 through the arm 93, balances the circuit again. Then the relay 95 is deenergized and the motor 91 is stopped.

This will cause a rise in the surface temperature of the direct expansion unit, so long as no change has occurred in the refrigeration capacity. The sensitive element 62" will operate the contacts 86 and 87 through the arm 94', the bellows 52" and the conduit 105, shifting the contacts 86 and 87 upon the potentiometers 93 and 94, respectively, and actuating the relay 95 to return the motor 91 somewhat toward its previous position. A new higher surface temperature will be established and the sensitive element 62" will be actuated, thereby tending to maintain the desired room temperature.

If the surface temperature rises too high, or if the latent heat load in the room increases, the relative humidity will rise and the humidity-sensitive element 97 will be actuated and will move the contact 58' by means of the link 96, thereby increasing the refrigeration capacity. This will increase the removal of both the latent and sensible heat and will reduce the surface temperature.

The reducing of the surface temperature will operate the sensitive element 62" and this will be transmitted to the bellows 52" which will shift the contacts 86 and 87 over the potentiometers 93 and 94, respectively. This will cause the switching element 82 to engage the contact 84 thereby producing an electrical current which will actuate motor 91. The motor 91 will cause the damper 32" to open wider and the damper 30" to be closed more. Then the circuits will be adjusted to a lower surface temperature.

In the course of these operations more sensible heat than necessary may be removed and then the temperature-sensitive element 69' will be actuated. The element 69' will actuate the contact 88 through the links 68' and 92', shifting the contact 88 toward the end 78a of the potentiometer 89. Then the current flowing through the coil 81 will be greater than the current flowing through the coil 80. The relay 95 will be energized and the motor 91 will be rotated in the direction of the arrow 111, actuating the dampers 30" and 32" to reduce the flow of air over the direct expansion unit, so as to adjust the circuit to a lower surface temperature. Then the removal of the sensible heat will be reduced, thereby tending to return the room temperature to the desired point.

If the apparatus of the system is properly constructed, the system will maintain the desired conditions automatically within the limitations of such apparatus (without humidification or separate reheat) and without any danger of freezing the coil.

This danger is present in the case of an air conditioning system using a direct expansion unit wherein refrigerant pressure inside the coils is used to control the dampers, because if the air passing over the outside of the unit has less heat, the surface temperature will be nearer the refrigerant temperature inside the coil and thus, if the surface temperature was just above freezing for a given refrigerant pressure, this temperature might drop below freezing with the same refrigerant pressure, if the total heat of the air passing over the direct expansion coil, were reduced.

This danger of freezing is entirely eliminated by the illustrated system constructed in accordance with the principles of the present invention, provided, of course, that the equipment is properly constructed. This is accomplished even without variable refrigeration capacity. In accordance with the present invention, an air conditioning system can operate at as low a surface temperature as possible, thereby assuring that the proportion of latent to sensible heat removal will be as great as possible. In those systems wherein reheat is employed, this is a very desirable feature since it automatically prevents the removal of more than the necessary amount of sensible heat, resulting in a real economy of operation.

The electrical system illustrated in Figure 2 may be replaced by other methods of operating the dampers in response to a function of the surface temperature and compensating this operation by a room condition or condition in the return duct. One of the principal features of this system is the control of the surface by means of the control of dampers 30" and 32" at a fixed or variable point by means of an instrument responsive to other conditions, such as the relative humidity or temperature of room air or air in the return duct, or outside conditions which would affect conditions in room 10, or any other conditions, in response to changes of which it is desired to change the surface temperature or its function.

The illustrated systems of control of a function of the surface temperature may be also used in conjunction with systems employing reheat, humidification, etc. In fact, many other variations and modifications may be made in the illustrated systems without departing from the scope or intent of the present invention.

What is claimed is:

1. The method of ventilating and conditioning a room, which includes withdrawing air from the room, conditioning some of said air by causing it to pass over the surface of a direct expansion refrigeration unit, adding to the conditioned air by-passed withdrawn air having a condition different therefrom, adjusting within variable limits the proportion of by-passed withdrawn air to said conditioned air responsive to a function of the surface temperature of said refrigeration unit, varying said variable limits responsive to predetermined conditions, and delivering the mixture of by-passed withdrawn air and conditioned air to said room in order to vary the conditions in said room.

2. The method of ventilating and conditioning a room, which includes withdrawing air from the room, conditioning some of said air by causing it to pass over the surface of a direct expansion refrigeration unit, adding to the conditioned air by-passed withdrawn air having a condition different therefrom, adjusting within variable limits the proportion of by-passed withdrawn air to said conditioned air responsive to a function of the surface temperature of said refrigeration unit, varying said variable limits responsive to air conditions, and delivering the mixture of by-passed withdrawn air and conditioned air to said room in order to vary the conditions in said room.

3. The method of ventilating and conditioning a room, which includes withdrawing air from the room, conditioning some of said air by causing it to pass over the surface of a direct expansion refrigeration unit, adding to the conditioned air by-passed withdrawn air having a condition different therefrom, adjusting within variable limits the proportion of by-passed withdrawn air to said conditioned air responsive to a function of the surface temperature of said refrigeration unit, varying said variable limits responsive to air conditions in said room, and delivering the mixture of by-passed withdrawn air and conditioned air to said room in order to vary the conditions in said room.

4. In an air conditioning system for a room to be conditioned, a return duct having an end communicating with said room, a suction passage having an end communicating with said room and another end communicating with the other end of said return duct, a refrigerating and dehumidifying zone in said suction passage close to said other end thereof, a by-pass connecting said return duct with said suction passage substantially in the middle of the latter, suction means in said suction passage close to the first-mentioned end thereof, a mixing zone formed in said suction passage close to said by pass, direct expansion refrigerating means in said refrigerating and dehumidifying zone, a damper in said by-pass, another damper in said suction passage between said direct expansion refrigerating means and said other end of the suction passage, means connected with said other end of the suction passage for supplying fresh air thereto, compressor means connected with said direct expansion refrigerating means, condensing means, means connecting said compressor means with said condensing means, means connected with said compressor means and comprising a value for varying the capacity thereof, means responsive to a change in conditions in said room for actuating said capacity-varying means, and means responsive to a function of the surface temperature of said direct expansion refrigerating means and operatively connected with said dampers to adjust the positions thereof and thereby vary the proportions of treated to untreated recirculated air.

5. In an air conditioning system for a room to be conditioned, a return duct having an end communicating with said room, a suction passage having an end communicating with said room and another end communicating with the other end of said return duct, a refrigerating and dehumidifying zone in said suction passage close to said other end thereof, a by-pass connecting said return duct with said suction passage substantially in the middle of the latter, suction means in said suction passage close to the first-mentioned end thereof, a mixing zone formed in said suction passage close to said by-pass, direct expansion refrigerating means in said refrigerating and dehumidifying zone, a damper in said by-pass, another damper in said suction passage between said direct expansion refrigerating means and said other end of the suction passage, means connected with said other end of the suction passage for supplying fresh air thereto, means responsive to a function of the surface temperature of said direct expansion refrigerating means and operatively connected with said dampers to adjust the positions thereof and thereby vary the proportions of treated to untreated recirculated air, means responsive to a change in conditions in said room, and means operatively connecting said change-responsive means with said damper-adjusting means.

6. In an air conditioning system, in combination with a room to be conditioned, a return duct having an end communicating with said room, a suction passage having an end communicating with said room and another end communicating with the other end of said return duct, a by-pass connecting said return duct with said suction passage substantially in the middle of the latter, suction means in said suction passage close to the first-mentioned end thereof, direct expansion refrigerating means in said suction passage close to said other end thereof, a damper in said by-pass, another damper in said suction passage between said direct expansion refrigerating means and said other end of the suction passage, means connected with said other end of the suction passage for supplying fresh air thereto, means responsive to a function of the surface temperature of said direct expansion refrigerating means, means responsive to a change in conditions in said room, and a motor operatively connected with said dampers; an electric system for actuating said motor, said system comprising a relay operatively connected with said motor for actuating the same in opposite directions, two potentiometers operatively connected with said relay, means operatively connecting said surface temperature-responsive means with said potentiometers for actuating the latter, a third potentiometer operatively connected with said conditions-responsive means and the first-mentioned potentiometers and actuated by the former, a fourth potentiometer operatively connected with said motor and said relay and actuated by the former, and a source of current supply connected with said third and fourth potentiometers, said relay and said motor.

MELVIN ATKINSON RAMSEY.

REFERENCES CITED

The following references are of record in the file of this patent:

UNITED STATES PATENTS

| Number | Name | Date |
| --- | --- | --- |
| 2,321,242 | Ramsey | June 8, 1943 |
| 2,290,426 | Haines | July 21, 1942 |